United States Patent [19]

Braun et al.

[11] Patent Number: 4,631,549

[45] Date of Patent: Dec. 23, 1986

[54] METHOD AND APPARATUS FOR ADJUSTING STIMULATION AMPLITUDE IN CONTINUOUS INK JET PRINTER

[75] Inventors: Hilarion Braun, Xenia; Linda Lush; Scott Lehman, both of Dayton, all of Ohio

[73] Assignee: Eastman Kodak Company, Rochester, N.Y.

[21] Appl. No.: 765,972

[22] Filed: Aug. 15, 1985

[51] Int. Cl.⁴ .................... G01D 18/00

[52] U.S. Cl. .................... 346/1.1; 346/75

[58] Field of Search .................... 346/1.1, 75

[56] References Cited

U.S. PATENT DOCUMENTS

| | | | |
|---|---|---|---|
| 3,761,941 | 9/1973 | Robertson | 346/1.1 |
| 3,928,855 | 12/1975 | Helinski et al. | 346/1.1 |
| 4,016,571 | 4/1977 | Yamada | 346/75 |
| 4,032,924 | 6/1977 | Takano et al. | 346/75 |
| 4,047,183 | 9/1977 | Taub | 346/1.1 |
| 4,068,241 | 1/1978 | Yamada | 346/75 |
| 4,136,676 | 1/1979 | Daniels | 260/29.6 HN X |
| 4,157,551 | 6/1979 | Takano et al. | 346/75 |
| 4,367,476 | 1/1983 | Sagae | 346/1.1 |
| 4,368,474 | 1/1983 | Togawa et al. | 346/75 |
| 4,373,164 | 2/1983 | Osaki et al. | 346/75 |
| 4,400,705 | 8/1983 | Horike | 346/75 |
| 4,417,256 | 11/1983 | Fillmore et al. | 346/75 |
| 4,487,320 | 12/1984 | Auer | 209/3.1 |

OTHER PUBLICATIONS

IBM Technical Disclosure Bulletin, vol. 22, No. 7, Dec. 1979, pp. 2666–2668.

*Primary Examiner*—E. A. Goldberg
*Assistant Examiner*—Gerald E. Preston
*Attorney, Agent, or Firm*—Thomas H. Close

[57] ABSTRACT

In a continuous ink jet printer, the stimulation amplitude is adjusted by sensing the stimulation amplitude at which infinite satellites are first produced, and adjusting the stimulation as a function of the sensed amplitude.

10 Claims, 3 Drawing Figures

METHOD AND APPARATUS FOR ADJUSTING STIMULATION AMPLITUDE IN CONTINUOUS INK JET PRINTER

TECHNICAL FIELD

The invention relates to continuous ink jet printing and more particularly to adjusting the stimulation amplitude in a continuous ink jet print head.

BACKGROUND

In a continuous ink jet printer, a continuous jet of electrically conductive ink is expelled from a microscopic orifice in a print head to form an ink filament. The ink jet is stimulated by a periodic disturbance induced by a stimulation signal applied to the ink jet head to cause the ink jet to reliably break up into an evenly spaced series of drops. An electrode located in the vicinity of the drop break-off point is employed to induce a controlled amount of charge on the ink jet filament. The induced charge is trapped on the ink drop as it separates from the filament, and the trajectory of the ink drop is determined by the interaction between the charged drop and local electric fields. In a binary type ink jet printer, drops are either charged or not. Charged drops are deflected along a catch trajectory into an ink drop catcher and uncharged drops proceed undeflected to an ink receiving surface such as paper. In another type of continuous ink jet printer, drops are selectively deflected along a plurality of printing trajectories, or a catch trajectory, depending upon the level of charge imparted to the drops by the charging electrodes.

In such continuous ink jet printers, the length of the ink jet filament varies as a function of the amplitude of the stimulation signal applied to the ink jet print head. Variables such as ink pressure, temperature, viscosity and surface tension affect the relationship between the filament length and the stimulation amplitude. Generally, at very low stimulation amplitudes, the ink jet filament is relatively long and small satellite droplets that are produced are quickly overtaken by and assumed into the main drops. As the stimulation amplitude is further increased, the ink jet filament shortens, and the velocity of the small satellite droplets increases until a point is reached where the velocity of the small satellite droplets equals the velocity of the main ink drops. This is called the infinite satellite region, and it occurs in a relatively narrow band of stimulation amplitudes. As the stimulation amplitude is further increased, the velocity of the satellite droplets is greater than the main drops, and the satellite droplets quickly overtake and are assumed into the main drops.

A further increase in stimulation amplitude produces a satellite-free region of operation, where no satellites are formed. Past the upper end of the satellite-free region, as stimulation amplitude is further increased, the filament length reaches a minimum, and begins to lengthen again. In this region of operation, called "overdrive," satellites are once again produced. Because it is difficult to control drop charging and deflection in the presence of satellites, it is desirable to operate the ink jet print head in the satellite-free region. (It should be noted that in some ink jet printing systems infinite satellites are intentionally produced and employed to print. The present invention is not directed to such ink jet printing systems employing infinite satellites to print.) Because changes in ink temperature, and viscosity (due for example, to solvent evaporation) change the relationship between stimulation amplitude and filament length, and hence the regions of satellite production, it becomes desirable to have a means for periodically automatically adjusting the stimulation amplitude to insure that the stimulation of the ink jet print head remains in the satellite-free region.

U.S. Pat. No. 4,368,474 issued Jan. 11, 1983 to Togawa et al discloses a system for controlling stimulation amplitude in an ink jet print head. In the apparatus disclosed by Togawa et al, a narrow drop charging pulse is applied to the drop charging electrode. The narrow pulse is phase shifted through the stimulation cycle while monitoring the charge induced on the ink drops by a sensing capacitor electronically connected to the ink supply. When the phase of the charging pulse matches the phase of drop separation, a charge is induced on the sampling capacitor. The production of satellites is indicated by a relatively large charge at some phase on the capacitor indicating the phase of main drop separation, and a relatively smaller charge at another phase, indicating the phase of satellite drop separation. If charge is present on the sampling capacitor at only one phase, this indicates that the ink jet print head is being operated in the satellite-free region. The stimulation amplitude is adjusted until the measurement indicates that stimulation is occurring in the satellite-free region.

One shortcoming of this method of stimulation adjustment is that the drop charge sensing apparatus suffers from a low signal-to-noise ratio. The relatively large capacitance between the ink jet and the drop charging electrodes tends to overwhelm any signal that can be detected by the sampling capacitor connected to the grounded ink supply.

Another shortcoming is due to the fact that the measuring technique relies on phase information generated by phase shifting the narrow charging signal across the stimulation cycle. In a multiple jet ink jet print head, the technique can not be performed on all the jets simultaneously, due to the difference in drop separation phase from jet to jet. This phase difference (called the "phase defect") has been found to range between 20° and 90° in a multijet print head having 64 jets.

A further shortcoming of the technique is the fact that the disclosed technique does not insure that the stimulation amplitude is adjusted to a point near the middle of the range of satellite-free operation. If the adjustment results in operation near the edge of the range of satellite-free operation, slight changes in ink viscosity or temperature can cause the system to go out of adjustment and start producing satellites.

Accordingly, it is an object of the present invention to provide a method and apparatus for adjusting stimulation amplitude in an ink jet print head that is free from the shortcomings noted above.

DISCLOSURE OF THE INVENTION

The object of the invention is achieved by sensing the stimulation amplitude at which infinite satellites are first produced, and adjusting the stimulation amplitude as a function of sensed amplitude. In a preferred mode of practicing the invention, a low charging voltage insufficient to cause main drop deflection into a catcher is applied to charging electrodes, and the stimulation amplitude is varied while the ink jet current is monitored by an electrometer having a sensing electrode located in the path of the ink jet. At the point at which infinite satellites are produced, the ink jet current suddenly dips due to the infinite satellites being deflected into the catcher, and thereby carrying off a portion of the jet current. This dip in jet current is detected to identify the stimulation amplitude at which infinite satellites are produced. The stimulation amplitude is adjusted by multiplying the sensed amplitude by a predetermined constant. In an ink jet printer having ink with a viscosity ranging between 1.5 to 2.8 Cp this constant was determined to be 2.2.

MODES OF CARRYING OUT THE INVENTION

Figure 1:
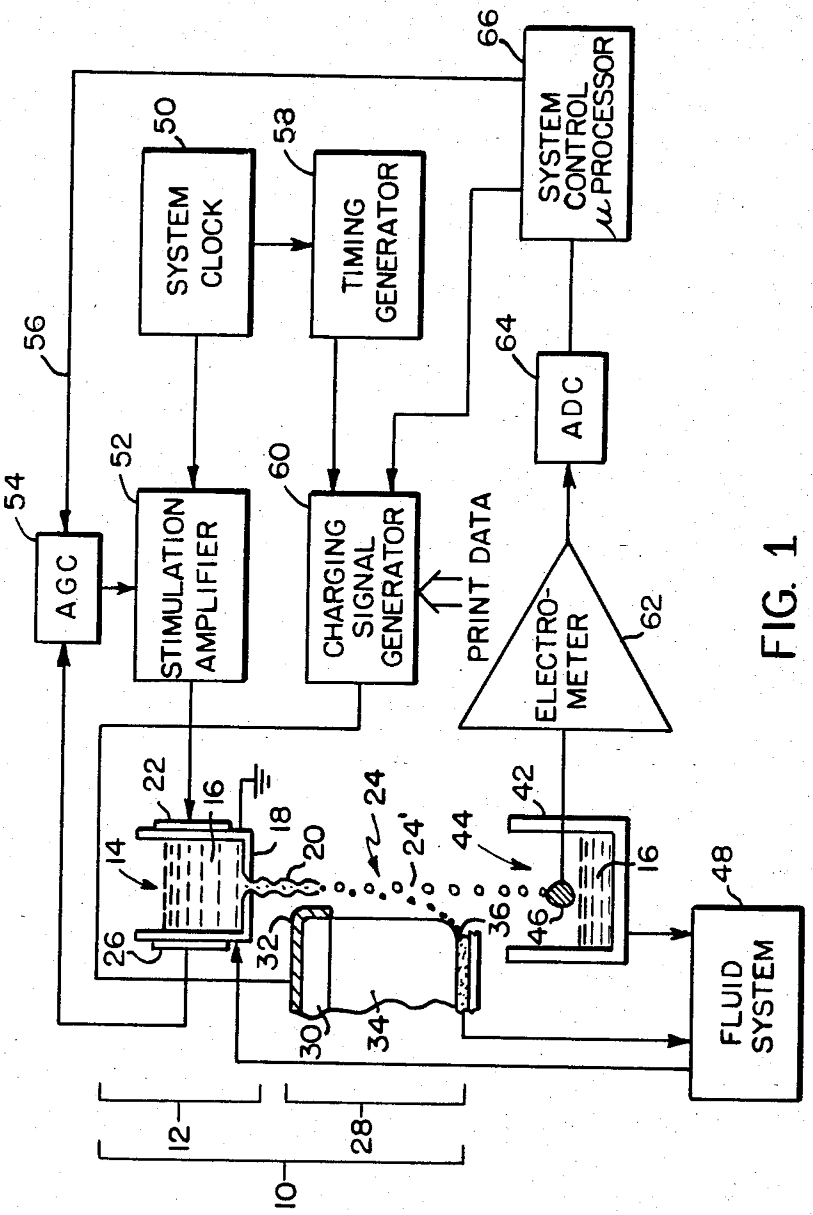
FIG. 1 is a schematic diagram showing an ink jet printing head having stimulation amplitude adjustment according to the present invention.

Referring to FIG. 1, a continuous binary ink jet printing head is shown schematically in cross section, along with associated electronics for practicing a preferred mode of the present invention. The printing head is of the type shown in U.S. patent application Ser. No. 390,105 filed June 21, 1982 in the name of Braun. The ink jet printing head 10 includes an upper head portion 12 defining an ink reservoir 14 containing, under pressure, conductive ink 16. The pressurized ink is forced through an orifice plate 18 to produce an ink filament 20.

A piezoelectric transducer 22 is mechanically coupled to the upper head portion 12 of the ink jet print head for inducing mechanical vibrations in the upper head portion, and thereby in the ink, to stimulate controlled breakup of the ink filament into drops 24. A piezoelectric feedback transducer 26 measures the amplitude of stimulation imparted to the upper head portion 12 by the transducer 22.

The ink jet printing head includes a lower portion 28 having a charging plate 30, with a drop charging electrode 32 arranged adjacent the ink jet filament 20 for inducing charges on the ink drops 24 as they separate from the ink filament 20. Charged drops are deflected into the face of a drop catcher 34 where they are collected into an ink gutter 36 comprising a slot at the bottom of the drop catcher 34.

A nose cup 42 is provided at a storage and startup station (not shown) arranged at a suitable location within the ink jet printer. When the ink jet printing head 10 is not being used to print, it is positioned over the nose cup 42. The nose cup defines an ink sump 44 for receiving ink drops from the ink jet print head that are not sufficiently charged to be deflected onto the drop catcher 34. An electrometer electrode 46 is located in the nose cup 42 in a position to receive the electrical charge carried by the ink drops entering nose cup 42.

A fluid system 48, hydraulically connected to the print head 10, and nose cup 42, supplies the conductive ink, under pressure, to ink reservoir 14 in the upper head portion 12 of the printing head, and recirculates the ink from the ink gutter 36 in the lower portion 28 of the ink jet printing head, and recirculates the ink from the sump 44 and the nose cup 42.

The ink jet printer electronics includes a system clock 50 that supplies a periodic clock signal (e.g., 75 KHz) to a stimulation amplifier 52. The output of the stimulation amplifier 52 is applied to the piezoelectric transducer 22 on the upper head portion 12 of the ink jet printing head 10. The gain of the stimulation amplifier, and hence the amplitude of the stimulation signal is controlled by an automatic gain control servo 54. The automatic gain control servo 54 receives a reference level signal on line 56, and a feedback signal from feedback transducer 26, and controls the gain of the stimulation amplifier such that the feedback signal matches the reference signal.

The clock signal from the system clock 50 is also provided to a timing generator 58 that produces timing pulses that determine the phase of the printing pulses that are applied to charging electrode 32. The timing pulses are applied to a charging signal generator 60 that receives a digital print data signal during printing and generates the printing pulses that are applied to the charging electrode 32.

An electrometer 62 is connected to the electrometer electrode 46, and generates an analog signal that is proportional to the ink jet current incident on the electrometer electrode 46. The analog output signal of the electrometer is supplied to an analog to digital convertor 64 to produce a digital signal indicative of the ink jet current sensed by the electrometer 62.

A system control microprocessor 66 receives the digital ink jet current signal from the electrometer 62 and is programmed as described below, to control the gain of the stimulation amplifier 52 by providing a reference signal to automatic gain control circuit 54 on line 56.

The general principle of operation of the present invention will now be described. The natural filament length of an unstimulated ink jet is relatively long, and the drop separation is not well behaved. As the stimulation amplitude is increased, the filament gets shorter. Eventually, slow satellite drops (small droplets occurring between the main ink drops which travel slower than the main drops and hence are quickly overtaken and assumed into the main drops) are formed. As the stimulation amplitude is further increased, the speed of the satellites increases until a region is reached wherein the speed of the satellite droplets equals the speed of the main ink drops, and the satellite droplets remain separate from the main drops. This is called the infinite satellite region. A further increase in stimulation amplitude produces fast satellites (droplets that travel faster than the main drops, and hence overtake and are assumed by the main drops). It should be noted that the boundaries of these regions are not clearly defined, the general locations of the regions of satellite production are a function of ink temperature, pressure, viscosity and surface tension.

As the stimulation amplitude is further increased, a region of satellite-free drop production is encountered. This region is the desirable range of operation of the ink jet print head. At some higher stimulation amplitude, the ink jet filament reaches a minimum, and begins to lengthen again. In this region, called overdrive, satellites may also be produced, but their production is extremely unreliable.

The inventors have determined through experimentation that operation in the region of satellite-free stimulation can be reliably achieved by detecting the stimulation amplitude at which infinite satellites are first produced, and adjusting the stimulation amplitude as a function of the detected stimulation amplitude. This method of stimulation adjustment has been found to be reliable in the presence of changes in ink pressure, temperature, viscosity, and surface tension.

The inventors have further determined that when the drops are charged by the drop charging electrode 32 (see FIG. 1) the charge to mass ratio of the infinite satellite droplets is much higher than the charge to mass ratio of the main drops. This phenomena is employed to detect the production of infinite satellites in the following manner. A relatively low charging voltage (e.g. 50 volts) insufficient to deflect the main drops into the catcher 34 is applied to the charging electrode 32. Then while the stimulation amplitude is increased from a predetermined low value, below the range of infinite satellite production, the ink jet current is monitored by electrometer 62. When the stimulation amplitude reaches the point where infinite satellites are produced, the satellite droplets, with their higher charge to mass ratio, are deflected into the catcher. The measured ink jet current exhibits a sudden dip because some of the charge is being diverted to the catcher with the satellite droplets rather than being deposited on the electrometer electrode 46.

Figure 2:
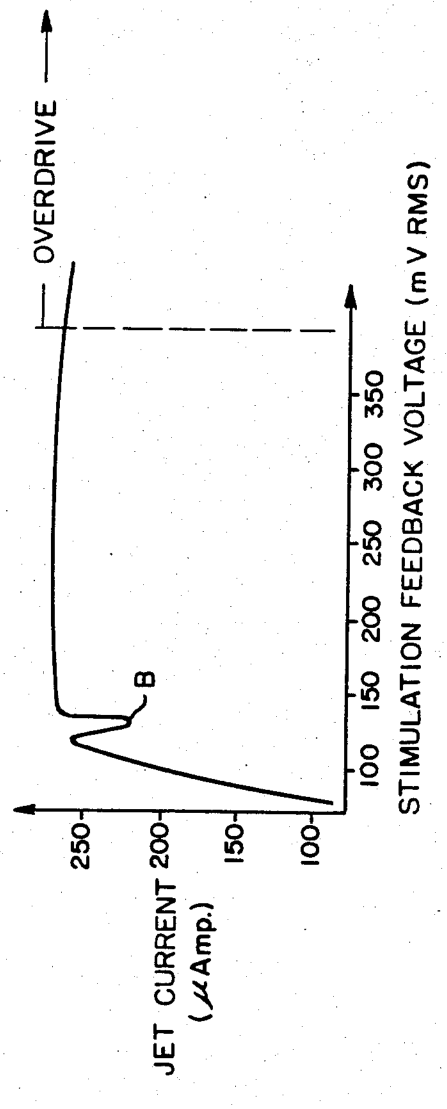
FIG. 2 is a plot showing ink jet current as a function of the stimulation amplitude.

FIG. 2 shows a plot of the measured ink jet current when a charge of 50 volts was placed on the charging electrode 32, and the stimulation amplitude was increased monotonically from a low value. The dip in ink jet current labelled B in FIG. 2 indicates the region of infinite satellite production.

Figure 3:
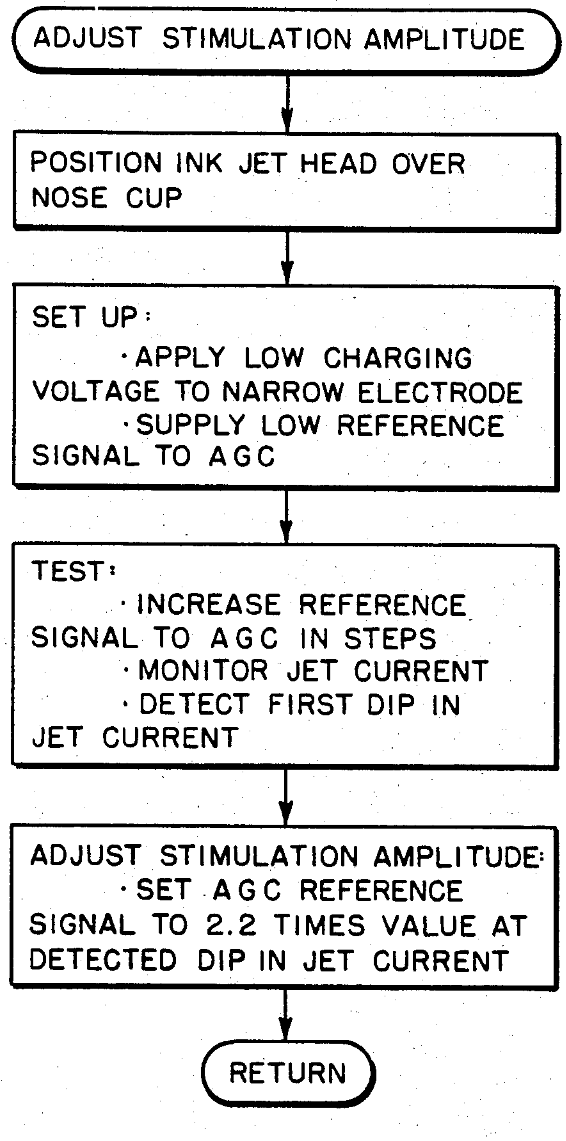
FIG. 3 flow chart illustrating the steps in the method of filament length measurement according to the present invention.

FIG. 1 shows how the infinite satellites 24' are deflected into the catcher while the main drops continue on to encounter the electrometer electrode 46. The method of stimulation adjustment according to the present invention will now be described with reference to the flow chart of FIG. 3.

The ink jet printing head is positioned over the nose cup 42 as shown in FIG. 1. The system control microprocessor 66 is programmed to command the charging signal generator 60 to apply a low charging voltage (e.g. 50 volts) to the drop charging electrode 32 and to set stimulation amplitude at a predetermined low value by applying a low reference level to AGC circuit 54. Next, the stimulation amplitude is monotonically increased while monitoring the ink jet current. The system control microprocessor 66 detects the first dip in ink jet current, and stores the stimulation amplitude at which the dip occurred. The stimulation amplitude is then adjusted as a function of the detected amplitude at the dip. This method of stimulation amplitude adjustment was applied to a multijet ink jet print head of the type shown in U.S. patent application Ser. No. 390,105 noted above having 64 jets. The detected stimulation amplitude at infinite satellite production was multiplied by a factor of 2.2 to determine the operating stimulation amplitude. This factor was found to adequately adjust stimulation amplitude to the center of the region of satellite free operation over a range of ink viscosities from 1.5 Cp to 2.8 Cp. Overdrive was observed to occur between 3.2 and 3.4 times the stimulation amplitude at which the dip was noted. With one type of ink jet print head tested, filament break up was observed to be quite stable in the lower regions of overdrive, and it was determined to be desirable to operate the ink jet print head nearer to the region of overdrive to take advantage of this stability. Accordingly, the multiplication factor was set at 3.0 with good results.

In an alternative mode of practicing the invention, the electrometer electrode is positioned in the ink gutter 36. The ink jet print head is operated with a low charging voltage on the charging electrode 32 as described above, and the spike in current sensed by the electrometer as the infinite satellites are deflected into the catcher is detected to determine the stimulation amplitude that produces the infinite satellites. The stimulation amplitude is then adjusted as a function of the detected amplitude as described above.

Advantages and Industrial Applicability

The ink jet stimulation adjusting method and apparatus is useful in automatically adjusting the stimulation amplitude in continuous ink jet printer. The apparatus provides a reliable method of measuring ink jet stimulation effects, with a high signal to noise ratio, and the measurement is independent of drop separation phase so that the method can be applied simultaneously to a plurality of ink jets. The method has the further advantage of adjusting the stimulation amplitude to the center of the range of satellite-free stimulation, so that slight changes in ink viscosity, temperature, and pressure will not disturb the system into satellite production.

We claim:

1. A method for adjusting stimulation amplitude in a continuous ink jet printer to operate the ink jet printer in the satellite free region of ink drop production, characterized by the steps of:

periodically sensing the stimulation amplitude at which infinite satellites are first produced, and adjusting the stimulation amplitude as a function of the sensed amplitude.

2. The method of adjusting stimulation amplitude claimed in claim 1, wherein said function of sensed amplitude comprises multiplication by a constant factor.

3. The method of adjusting stimulation amplitude claimed in claim 2, wherein the ink viscosity may vary between 1.5 to 2.8 Cp and wherein said constant multiplication factor is 2.2.

4. The method of adjusting stimulation amplitude claimed in claim 1, wherein said sensing step is further characterized by:

sensing the ink jet current with an electrometer located in the path of the undeflected ink jet, and detecting the stimulation amplitude at which a sudden dip occurs in the ink jet current as the stimulation amplitude is increase, due to infinite satellite drops being deflected into a catcher.

5. The method of adjusting stimulation amplitude claimed in claim 1, wherein said sensing step is further characterized by:

sensing the stimulation amplitude at which satellites are deflected into a catcher, as the stimulation amplitude is increased from a predetermined low value, by means of an electrometer having an electrode located in the catcher.

6. Apparatus for adjusting stimulation amplitude in a continuous ink jet printer to operate the ink jet printer in the satellite free region of ink drop production, characterized by:

means for periodically sensing the stimulation amplitude at which infinite satellites are first produced; and means for adjusting the stimulation amplitude as a function of the sensed amplitude.

7. The apparatus for adjusting stimulation amplitude claimed in claim 6, wherein said means for adjusting comprises means for multiplying the sensed amplitude by a constant factor.

8. Apparatus for adjusting stimulation amplitude claimed in claim 7, wherein the ink viscosity may vary between 1.5 to 2.8 Cp, and wherein said constant multiplication factor is 2.2.

9. Apparatus for adjusting stimulation amplitude claimed in claim 8, wherein said means for sensing is further characterized by:

an electrometer having a sensing electrode located in the path of the undeflected ink jet or generating a signal representative of the ink jet current; and means responsive to said current signal for detecting a dip in the current signal as the stimulation amplitude is increased.

10. Apparatus for adjusting stimulation amplitude claimed in claim 9, wherein said sensing means is further characterized by:

means for sensing the stimulation amplitude at which satellites are deflected into a catcher including an electrometer having an electrode located in the catcher.

* * * * *